US012800549B2

(12) United States Patent
Barut et al.

(10) Patent No.: US 12,800,549 B2
(45) Date of Patent: Nov. 17, 2026

(54) METHOD FOR ANALYZING A PART USING NON-DESTRUCTIVE TESTING WITH ULTRASONIC WAVES

(71) Applicants: Airbus SAS, Blagnac (FR); Airbus Operations SAS, Toulouse (FR)

(72) Inventors: Silvere Barut, Blagnac (FR); Franck Bentouhami, Toulouse (FR); Louis Le Pinru, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 348 days.

(21) Appl. No.: 18/533,452

(22) Filed: Dec. 8, 2023

(65) Prior Publication Data

US 2024/0192176 A1 Jun. 13, 2024

(30) Foreign Application Priority Data

Dec. 12, 2022 (FR) ........................................ 2213191

(51) Int. Cl.

*G01N 29/38* (2006.01)
*G01N 29/04* (2006.01)
*G01N 29/09* (2006.01)
*G01N 29/44* (2006.01)

(52) U.S. Cl.

CPC ........... *G01N 29/09* (2013.01); *G01N 29/041* (2013.01); *G01N 29/44* (2013.01); *G01N 2291/044* (2013.01); *G01N 2291/101* (2013.01)

(58) Field of Classification Search

CPC ...... G01N 29/09; G01N 29/041; G01N 29/44; G01N 2291/044; G01N 2291/101; G01N 29/07; G01N 29/38; G01N 29/40; G01N 29/4436; G01N 2291/2638; G01N 29/043; G01N 29/0645; G01N 2291/023; G01N 2291/0289

USPC ........ 73/1.86, 598, 602, 609, 610, 611, 615, 73/616, 620–624

See application file for complete search history.

(56) References Cited

U.S. PATENT DOCUMENTS 4,947,351 A 8/1990 Moran et al.

FOREIGN PATENT DOCUMENTS

EP 4105681 A1 * 12/2022 ........... G01S 17/931
JP 2005283134 A 10/2005

OTHER PUBLICATIONS

French Search Report for corresponding French Patent Application No. 2213191 dated Jun. 23, 2023; priority document.

* cited by examiner

*Primary Examiner* — Robert R Raevis
(74) *Attorney, Agent, or Firm* — Greer, Burns & Crain, Ltd.

(57) ABSTRACT

A method for analyzing the quality of a first mechanical part comprising determining a measurement data filtering template from information representing an ultrasonic wave reflected in a second mechanical part, called "master" part, when emitting an ultrasonic wave along a predefined application path, then extracting information representing the quality of the first part from information representing the ultrasonic wave reflected in the first part and from the template, the template comprising a plurality of amplitude thresholds of the reflected wave expressed relative to the travel time of the wave in the parts.

12 Claims, 4 Drawing Sheets

METHOD FOR ANALYZING A PART USING NON-DESTRUCTIVE TESTING WITH ULTRASONIC WAVES

CROSS-REFERENCES TO RELATED APPLICATIONS

This application claims the benefit of the French patent application No. 2213191 filed on Dec. 12, 2022, the entire disclosures of which are incorporated herein by way of reference.

FIELD OF THE INVENTION

The present invention relates to a non-destructive method for analyzing the quality of a mechanical part. More specifically, the invention relates to a method for selectively searching for at least one echo of an ultrasonic wave applied to the mechanical part for the purpose of carrying out a non-destructive test of the integrity of this part.

BACKGROUND OF THE INVENTION

Techniques for characterizing mechanical parts using the analysis of a propagated ultrasonic wave are widely used. These techniques are commonly used in the aerospace field to check the integrity of a part after production or during maintenance operations. These techniques use the emission of an ultrasonic wave emitted by a transducer placed on the surface of a part to be inspected or even close to the surface of the part immersed in water. The ultrasonic wave thus emitted is reflected (echo phenomenon) when it encounters a break in the acoustic impedance of the material of the tested part, due to the shape of the part or even the presence of a defect in the integrity of the part. The analysis methods relating to these tests often use visual representations, of the oscillogram type, for showing the ultrasonic wave and/or one or more echoes of this wave scattered in the part being evaluated. The illustration of the reflected ultrasonic wave generally represents the amplitude of the reflected wave as a function of time, which allows the travel times of the wave in the material of the part to be observed and echoes specific to the reflection of the wave on surfaces of the part or on any defects that are present to be highlighted. Software for analyzing measured signals representing a reflected ultrasonic wave can be used to perform simple filtering by determining filtering windows. A filtering window is defined by an amplitude threshold between two time limits, so as to filter signals representing echoes, the presence of which is normal or desired. However, this type of filtering is relatively basic and when a part to be analyzed has a complex shape, many echoes can coexist, meaning that the analysis is sometimes long and complex.

This situation can be improved.

SUMMARY OF THE INVENTION

An aim of the present invention is to propose an analysis method that dispenses with having to analyze echoes whose presence is expected in view of the shape and dimensions of the part to be tested, thereby substantially limiting the time for analyzing the integrity of a part.

To this end, a method is proposed for analyzing the quality of a first mechanical part using non-destructive testing, comprising:

acquiring first information representing an ultrasonic wave reflected when emitting the ultrasonic wave along a first application path in a second mechanical part made of a material identical to that from which the first mechanical part is made and having the same shape as the first mechanical part;

the method being characterized in that it further comprises:

determining a measurement data filtering template from the first information;

emitting the ultrasonic wave into the first mechanical part by applying it via a second application path;

acquiring, via at least one sensor, second information, representing the ultrasonic wave reflected in the first mechanical part during the propagation of the ultrasonic wave; and extracting third information representing the quality of the first part from the second acquired information and from the filtering template.

It is thus possible to dispense with having to analyze a large amount of information relating to a normal reflection of the ultrasonic wave in the part to be analyzed.

The method according to the invention can also include the following features, considered alone or in combination:

the filtering template is automatically determined from the first information;

the first information is acquired from a software tool for simulating the emission and reflection of an ultrasonic wave in a mechanical part of predefined shape;

the first information is acquired from at least one ultrasonic wave sensor;

the template is determined from a plurality of time intervals respectively associated with one or more filtering amplitude levels of the reflected ultrasonic wave;

at least one time interval is associated with a plurality of filtering amplitude levels of the reflected ultrasonic wave, with the amplitude levels exhibiting mutual continuity;

the second path is identical to the first path followed when emitting the wave in the second mechanical part.

The method for analyzing the quality of a part further comprises:

graphically representing the third information;

the filtering template is adjusted after all or some of the second information representing the ultrasonic wave reflected in the first mechanical part has been acquired.

Another aim of the invention is a system for analyzing the quality of a first mechanical part using non-destructive testing, comprising:

an input interface configured to acquire first information representing an ultrasonic wave reflected when emitting the ultrasonic wave along a first application path in a second mechanical part made of a material identical to that from which the first mechanical part is made and having the same shape as the first mechanical part;

the system being characterized in that it further comprises:

a first control unit configured to determine a measurement data filtering template from the first information;

a transducer configured to emit the ultrasonic wave into the first mechanical part by applying it via a second application path;

at least one sensor configured to acquire second information representing the ultrasonic wave reflected in the first mechanical part during the propagation of the ultrasonic wave; and a second control unit configured to extract third information representing the quality of the first part from the second acquired information and from the filtering template.

According to one embodiment, the input interface is an ultrasonic wave sensor.

The invention also relates to a computer program comprising program code instructions for executing the steps of the method described above when the program is executed by a processor, and relates to an information storage medium comprising such a computer program.

BRIEF DESCRIPTION OF THE DRAWINGS

The aforementioned features of the invention, as well as other features, will become more clearly apparent upon reading the following description of an embodiment, with the description being provided with reference to the attached drawings, in which.

DETAILED DESCRIPTION OF THE PREFERRED EMBODIMENTS

Figure 1:
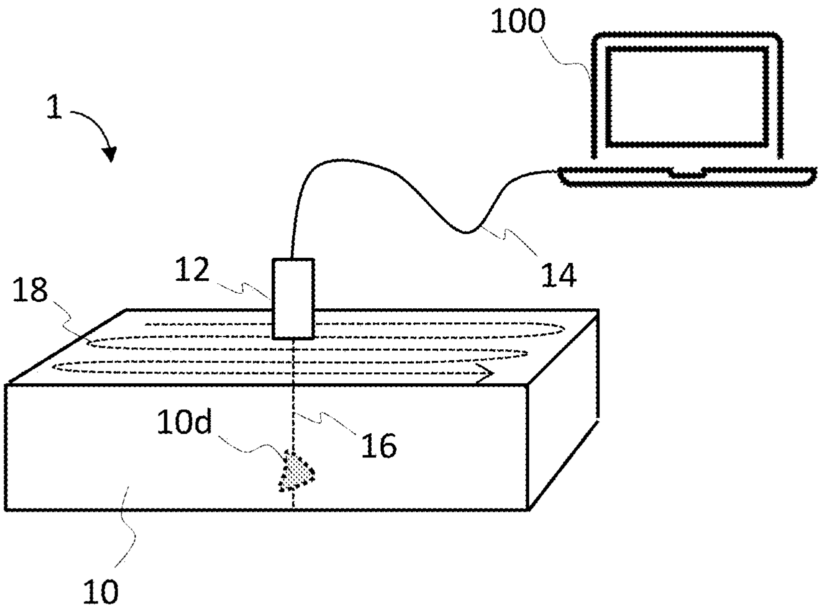
FIG. 1 schematically illustrates a system for analyzing the integrity of mechanical parts by emitting an ultrasonic wave.

FIG. 1 is a schematic representation of a system 1 for analyzing the quality of a mechanical part using non-destructive testing. The analysis system 1 comprises a transducer 12 connected to a processing unit 100 via a communication link 14. According to the example shown, the transducer 12 is positioned in contact with a parallelepiped shaped mechanical part 10, using a coupler product for guaranteeing good propagation of an ultrasonic wave generated by the transducer 12. More specifically, the transducer 12 is positioned and coupled in contact with the upper face of the mechanical part 10. The transducer 12 comprises an ultrasonic wave emitter 12*e* (not shown in FIG. 1) configured to emit a reference ultrasonic wave 16 on the surface of the mechanical part 10. The transducer 12 further comprises an ultrasonic wave sensor 12*r* (not shown in FIG. 1) configured to detect a present ultrasonic wave, such as, for example, a portion of the ultrasonic wave 16 reflected in the mechanical part 10. The ultrasonic wave emitter 12*e* is configured to convert an electrical control signal, received via the communication link 14, under the control of the processing unit 100, into the ultrasonic wave 16. The ultrasonic wave sensor 12*r* is configured to convert a present ultrasonic wave into an electrical signal representing this ultrasonic wave and to transmit this electrical signal to the processing unit 100, in the form of information. The analysis system 1 allows an integrity defect to be detected in a mechanical part, such as the mechanical part 10, by analyzing the signals received by the ultrasonic wave sensor 12*r* of the transducer 12, when the ultrasonic wave 16 is emitted into the part. The ultrasonic wave emitted and reflected in the tested part includes information representing the dimensions of the part and the shape thereof, as well as information on the material and the quality of the coupling of the transducer 12 with the tested part. For example, the material from which the tested part is made and/or the quality of the coupling between the transducer and the tested part have a significant effect on the amplitude of the reflected wave. In addition, the shape and the dimensions of the tested part have a significant effect on the positioning of the reflected wave relative to the incident wave applied to the part, as well as on the amplitude of the reflected wave. For example, if the bottom of the part is flat and perpendicular to the direction of propagation of the incident wave applied to the part, the reflected wave will have a greater amplitude than is observed if the bottom of the part is oblique and the incident wave is then broken down in several directions in order to form a reflected wave, the component of which that is seen by the transducer 12 will then be smaller. According to the described example, the mechanical part 10 has an integrity defect 10*d* inside the volume of the mechanical part 10, in the material. The integrity defect 10*d* is, for example, a zone exhibiting porosity such that the density of material is less in this zone than in the other parts of the mechanical part 10. When the ultrasonic wave 16 emitted from the transducer 12, under the control of the processing unit 100, encounters the integrity defect 10*d*, part of the ultrasonic wave 16 is reflected by the integrity defect 10*d*, due to the break (or variation) in acoustic impedance induced by the porosity. The ultrasonic wave transducer 12*r* can then pick-up the wave reflected on the defect 10*d* of the mechanical part 10, in addition to part of the ultrasonic wave 16 reflected on the bottom of the mechanical part 10*d*. Throughout the remainder of the description, an analysis of the integrity of a mechanical part from a predefined point on the upper surface of the mechanical part is referred to as an A-scan type analysis and an analysis of the integrity of a part from a plurality of points close together on the upper surface of a mechanical part is referred to as a C-scan type analysis. For example, successive A-scan type analyses performed along the path (or trajectory) 18 on the upper surface of the mechanical part 10 constitute a C-scan analysis. Of course, a C-scan type analysis requires that the successive application points of the ultrasonic wave that together form the application path 18 of the ultrasonic wave are close enough together so as not to risk missing a zone exhibiting an integrity defect.

The processing unit 100 comprises hardware means (notably including electronic circuits and signal processing circuits) and software means for controlling the transducer 12, but also for analyzing the signals originating from the ultrasonic wave sensor 12*r*, which represent the ultrasonic wave 16 emitted and reflected by an analyzed mechanical part.

Figure 2:
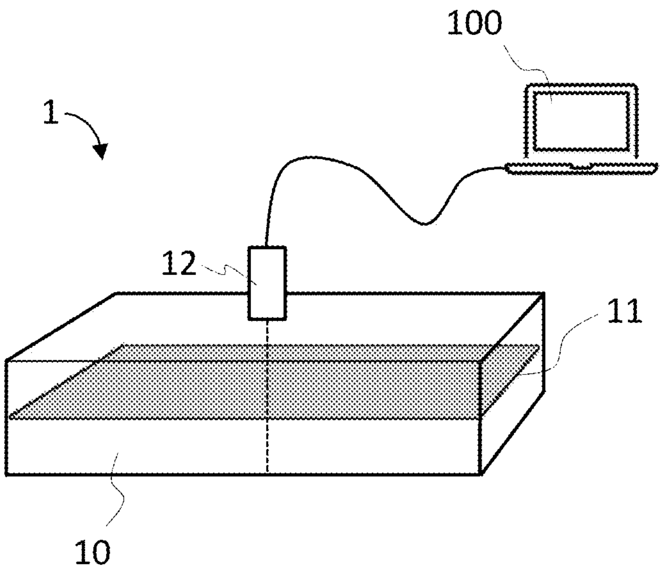
FIG. 2 schematically illustrates a C-scan type analysis using the system already shown in FIG. 1.
Figure 3:
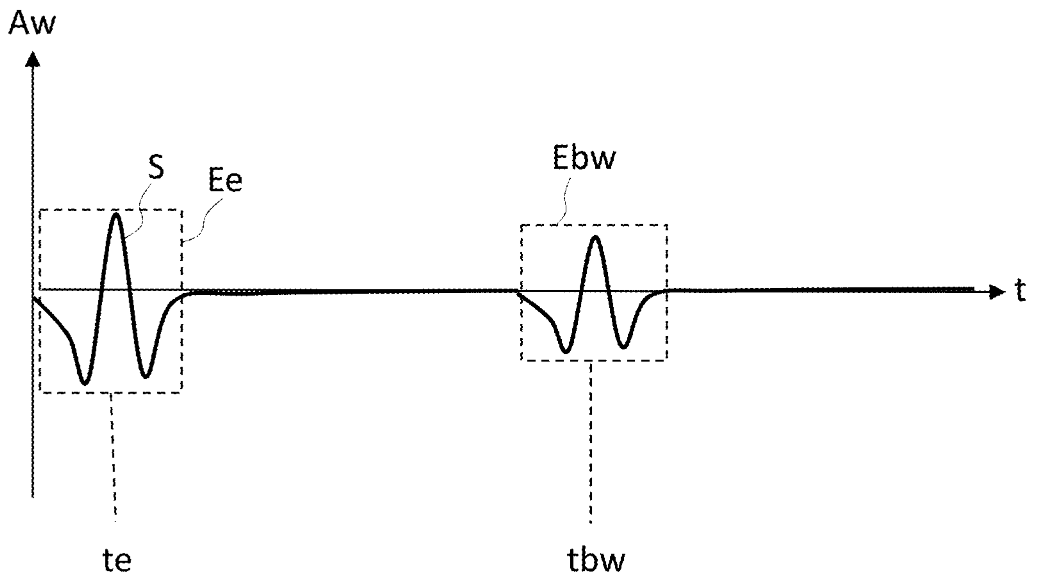
FIG. 3 schematically illustrates the measurement of an ultrasonic wave in a mechanical part being analyzed, without a defect.
Figure 4:
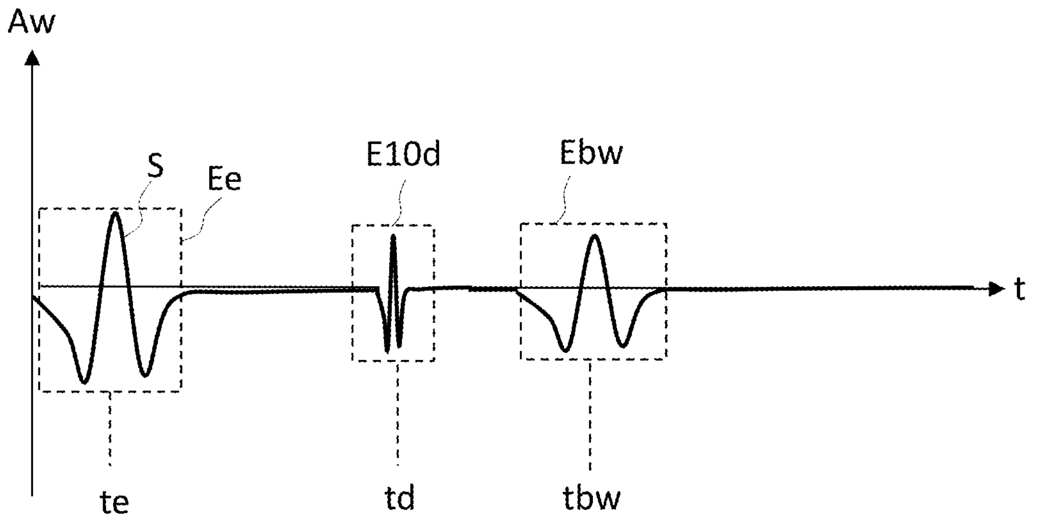
FIG. 4 schematically illustrates the measurement of an ultrasonic wave in a mechanical part being analyzed, with a defect in the integrity of the part.

In order to simplify the display of the results of the analysis of the integrity of a mechanical part, it is often advantageous to filter the signals received by an ultrasonic wave sensor, so as to dispense with having to display too many signals simultaneously. Indeed, displaying, by the processing unit 100, too much information representing the picked-up signals, and therefore parts of the reflected ultrasonic wave 16, is likely to lead to possible interpretation errors, which creates a risk of not detecting an integrity defect present in a mechanical part being analyzed. Filtering per time windows and per amplitude threshold (sometimes called "gate") is commonly used. Such filtering involves defining a viewing window associated with an ultrasonic wave sensor or a set of viewing windows associated with a plurality of ultrasonic wave sensors. The filtering can be temporal only, amplitude only or even both combined. The use of filtering allows only certain zones of a mechanical part to be analyzed or, more specifically, information representing certain zones of a mechanical part. For example, FIG. 2 illustrates, in grey, an internal zone (a plane) 11 of the mechanical part 10 that can be observed by temporally filtering the signals representing the ultrasonic wave 16 successively applied to all points on the upper surface of the mechanical part 10. To this end, it is worthwhile observing any signals representing the reflected ultrasonic wave 16, taking into account the travel time of the wave that would be reflected if there were a break in acoustic impedance in the zone 11. The travel time of an ultrasonic wave in a medium is commonly referred to as ToF (Time of Flight). Thus, if a representation of an ultrasonic wave emitted and reflected, then picked-up by an ultrasonic wave transducer, is represented in the form of an amplitude as a function of time, and a time reference is established from the emitted ultrasonic wave, temporal filtering amounts to only looking at the representation zone temporally defined as a function of the time of flight ToF that a wave reflected on an impedance break would take to arrive at a sensor with a predetermined position. FIG. 3 illustrates the concept of time of flight ToF and amplitude Aw of an ultrasonic wave reflected in a mechanical part, as a function of time. FIG. 3 illustrates, by way of an example, the amplitude Aw, as a function of time t, of the ultrasonic wave 16 reflected in the mechanical part 10 when the transducer 12 is positioned at a point on the upper surface of the mechanical part 10 from which the emitted ultrasonic wave 16 does not encounter the integrity defect 10*d* as it travels through the mechanical part 10. The time reference t=0 is predetermined and corresponds to the start of emission of the ultrasonic wave 16 by the emitter 12*e*, picked-up by the ultrasonic wave sensor 12*r*. The ultrasonic wave 16 is emitted in the form of a pulse S, the maximum energy of which appears at an emission time te. In FIG. 3, the emitted ultrasonic wave 16 is marked in an inset labelled Ee. If there is no integrity defect in the path of the ultrasonic wave 16, the wave is reflected on the opposite face of the part, forming an end of material (and therefore a break in acoustic impedance) and the wave thus reflected appears later, after a time tbw, on the representation. The reflection of the emitted pulse S is marked in FIG. 3 by an inset labelled Ebw. Such an analysis is carried out by emitting the ultrasonic wave 16 from a single point on the upper surface of the mechanical part 10. It is therefore an A-scan type analysis that does not show any defects, but which reveals information (notably time of flight and amplitude information) relating to the ultrasonic wave 16 reflected on the opposite surface of the mechanical part 10 being analyzed, also called the bottom of the mechanical part 10 herein. The time interval tbw-te is the time of flight of the pulse S through the thickness of the mechanical part 10. FIG. 4 illustrates an A-scan type analysis similar to that already illustrated in FIG. 3, except that this time the transducer 12 is positioned at a point on the upper surface of the mechanical part 10 so that the emitted ultrasonic wave 16 encounters the integrity defect 10*d* as it travels through the mechanical part 10. It appears that, in addition to the emitted pulse S (in the inset labelled Ee) and its reflection on the bottom of the part (in the inset labelled Ebw), the pulse S is reflected by the integrity defect 10*d*. Its reflection appears after a time of flight td and is marked by an inset labelled E10*d* in FIG. 4. The time td ranges between the time te and the time tbw, which clearly confirms that the defect is located in a zone located in the thickness of the part, between the upper surface, and more specifically the point on the upper surface of the mechanical part 10 on which the transducer 12 is positioned for this A-scan type analysis and the bottom of the mechanical part 10. The value of the time of flight td therefore represents the location of the zone exhibiting the integrity defect 10*d* in the mechanical part 10.

Figure 5:
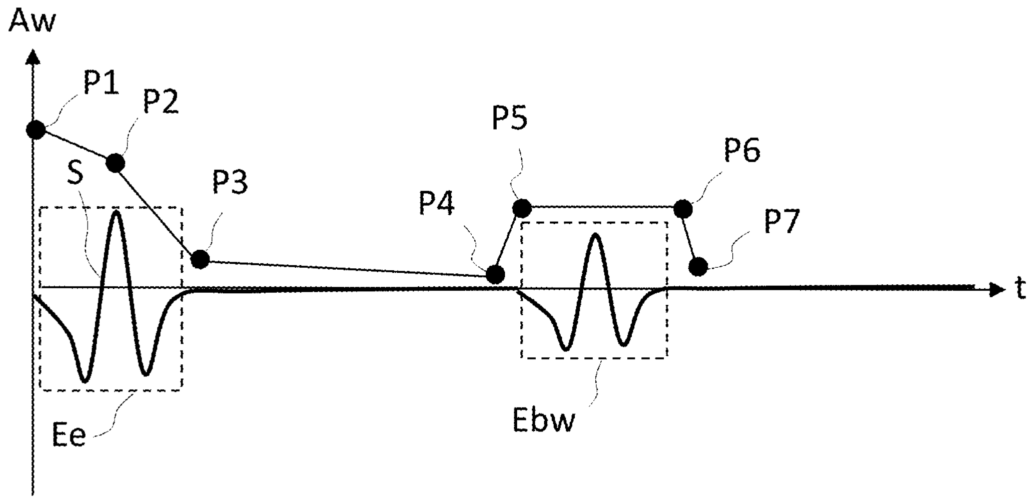
FIG. 5 schematically illustrates a filtering template for measuring an ultrasonic wave in a mechanical part being analyzed.

According to a first embodiment, when the quality and the integrity of a mechanical part must be analyzed, a filtering template is advantageously determined from information representing the ultrasonic wave 16 reflected in a defect-free mechanical part when emitting an ultrasonic wave in this "master" part. For example, an A-scan type analysis is carried out with a master part with identical shapes and dimensions to the mechanical part 10 to be analyzed, made from the same material as the mechanical part 10 to be analyzed, which analysis allows first information to be acquired, notably time of flight and amplitude information, of the reflection of the ultrasonic wave 16 in the mechanical part 10. This first information is, for example, the time of flight of the ultrasonic wave 16 that travels through the thickness of the master part (outward path), then is reflected on the bottom of the part and then returns (return path) to the ultrasonic wave sensor 12*r* of the transducer 12. The first information thus acquired therefore represents elements whose presence is completely normal (the bottom of the part, for example) and whose representation is therefore unnecessary during the analysis. Ingeniously and according to the invention, it is therefore possible to define, either manually, through the action of a user of the system, or automatically, under the control of the processing unit 100, a temporal and amplitude filtering template, aimed at eliminating information whose representation is unnecessary and likely to potentially mislead an observer using the system 1 for analyzing the quality of a mechanical part 10. Advantageously, the filtering template is stored in the processing unit 100, so that when an A-scan type analysis is then carried out under the same conditions, no longer on a master mechanical part but on a mechanical part to be tested, the filtering template can be used to define useful information and useless information as normally expected, optionally taking into account a margin of error. According to a first embodiment, a user of the analysis system 1 can define a filtering template by clipping the first acquired information, representing the reflection of the emitted ultrasonic wave in a master part. Clipping can be carried out by defining a plurality of coordinate points (amplitude, time of flight) so as to define an exclusion zone, using a user interface of analysis software. Thus, and when an ultrasonic wave reflected in a mechanical part to be analyzed is picked-up, any information that is likely, for example, to appear below the limit of the exclusion zone defined by the filtering template will automatically be removed from the display information representing the quality of the mechanical part being analyzed. FIG. 5 illustrates a filtering template defined by a user from information representing the reflection of the emitted ultrasonic wave 16 on the surface of a master mechanical part, assuming dimensions and a shape that are identical to the mechanical part 10, and made of the same material as the mechanical part 10. The first acquired information, representing the reflection of the ultrasonic wave 16, is "normally expected" since it is information representing the emitted ultrasonic wave 16 close to the emission point (entry point of the master mechanical part), as well as the reflection of the ultrasonic wave 16 on the bottom of the part, as explained above.

Advantageously, and according to the described example, the filtering template is determined by a user who successively defines points P1, P2, P3, P4, P5, P6 and P7 that together clip the information representing the ultrasonic wave reflected in the master part. For example, to this end the user can use a dedicated user interface of a software tool for simulating the emission and reflection of an ultrasonic wave in a mechanical part of predefined shape. Each of the points P1, P2, . . . , P7 is defined, for example, by its position on the time scale (in this case on the abscissa) and on the amplitude scale of the signal representing the reflected ultrasonic wave (in this case on the ordinate). A point is defined, for example, via a display interface of the processing unit 100 using a command for defining a filtering template and by successively clicking on various points on the display screen, using a mouse or a stylus. According to the example described in FIG. 5, the filtering template determined by points P1 to P7 is fairly approximate, insofar as it is not very close to the curve representing the ultrasonic wave reflected in the mechanical part, in order to simplify the illustration. Of course, the filtering template can include a larger number of points for defining the shape of the information exclusion zone, or even a very large number of points for defining an information exclusion zone.

Each pair of mutually neighboring points in the filtering template defines a time interval and a single amplitude filtering level if the two neighboring points have the same amplitude threshold (for example, P5 and P6 in FIG. 5) or even a time interval and a plurality of successive filtering levels if the two neighboring points have different amplitude thresholds (for example, P2 and P3 in FIG. 3).

Ingeniously and advantageously, the points can be positioned by the processing unit 100 automatically as opposed to manually.

Thus, and according to a second embodiment, the processing unit 100 analyses the maximum values of the first information representing the reflected ultrasonic wave and determines successive points defining a profile and therefore a filtering template, again optionally including a margin of error. These operations can be carried out by the processing unit 100 under the control of a software tool for simulating the emission and reflection of an ultrasonic wave in a mechanical part of predefined shape. According to a first alternative embodiment, the respective coordinates of the automatically determined points defining the filtering template assume the amplitude values of the reflected ultrasonic wave as a function of the time of flight of the ultrasonic wave. According to a second alternative embodiment, the respective coordinates of the automatically determined points are the amplitude values to which a margin (offset) is added as a function of the time of flight. These examples are not limiting and other methods for determining a filtering template, taking into account maximum values of the ultrasonic wave applied and reflected in a master part, can be defined.

According to one embodiment, an amplitude filtering threshold level, or, in other words, the ordinate coordinate of a point on the filtering template, depends on the amplitude of a signal received by an ultrasonic wave transducer at a distance from the source of the ultrasonic wave, (with the source being the transducer 12 in this case), and used to characterize the amplitude of the reflected ultrasonic wave as seen at a particular point on the surface of a mechanical part being analyzed, different from the application point of the wave. Advantageously, data originating from several ultrasonic wave sensors respectively positioned at several points on the surface of the part can be taken into account in order to define an even more precise filtering template.

Advantageously, several similar master parts can be successively used to define a final template from successively determined intermediate templates.

When the filtering template is determined and recorded, the same ultrasonic wave as that used and emitted in the master part to determine the filtering template this time is emitted in a part to be analyzed of identical shape and dimensions to those of the master part, made of the same material, in order to acquire second information representing the ultrasonic wave reflected in this part to be analyzed. The information corresponding to a reflected wave whose amplitude is below the filtering template then simply needs to be extracted in order to dispense with the information representing the reflected ultrasonic wave that is "normally expected" and that is inherent in the shapes of the part when it is devoid of any defects.

According to one embodiment, the filtering template is adjusted after all or some of the second information, representing the ultrasonic wave reflected in the mechanical part, has been acquired during the integrity test. Indeed, apart from those linked to the presence of one or more defects in the part, disparities can appear between the reflected wave measured and observed during the test, and the reflected wave measured and observed during the phase of defining the filtering template using a master part or simulation software. Such disparities can notably arise due to poor coupling between the transducer 12 and the mechanical part to be tested, or even due to possible variability in the dimensions of the mechanical part to be tested. Thus, for example, if the coupling between the transducer 12 and the mechanical part to be tested is such that it attenuates the emitted incident wave and the measurement of the reflected wave, during the test phase, the filtering template previously defined when acquiring information representing the reflected wave with a master part or from simulation software can be adjusted automatically, or manually by a user using an interface adapted to such an adjustment.

According to a third embodiment, an ultrasonic wave is successively emitted at a plurality of points on the upper surface of a part to be analyzed, so as to describe an application path for the ultrasonic wave at any point on the mechanical part, in other words by carrying out a C-scan type analysis. Advantageously, a filtering template is then determined for each of the successive application points of the ultrasonic wave, or, in other words, for each of the points of the application path of the ultrasonic wave (for example, the application path 18 shown in FIG. 1). It is thus possible to create a three-dimensional information exclusion zone or boundary (filtering template) that allows any information to be extracted that is normally expected during ultrasonic wave analysis of a mechanical part, due to its shape.

Advantageously, this makes it possible, when a part has a complex shape, for example, with significant variability in the thickness, or ribs, cavities, reliefs, reinforcements, for example, to determine which is all the information originating from picked-up signals that represents the ultrasonic wave reflected in the part and which is normally present due to the shape of the part. In this way, it is possible to advantageously dispense with having to observe and analyze a very large amount of information that does not represent an integrity defect in a mechanical part being analyzed. Advantageously, the speed of analysis is significantly increased.

According to one embodiment, the first information representing the ultrasonic wave reflected in a master part is not picked-up by an ultrasonic wave sensor during a phase of emitting this wave, but it is generated by a dedicated simulation tool configured to simulate the propagation and reflection of a predefined ultrasonic wave from any point of a mechanical part defined according to a three-dimensional CAD model, even with a complex shape, and characterized in terms of dimensions and manufacturing materials. This first information is then used in the analysis system 1 after being introduced into the system by means of an input interface intended for this use.

Figure 6:
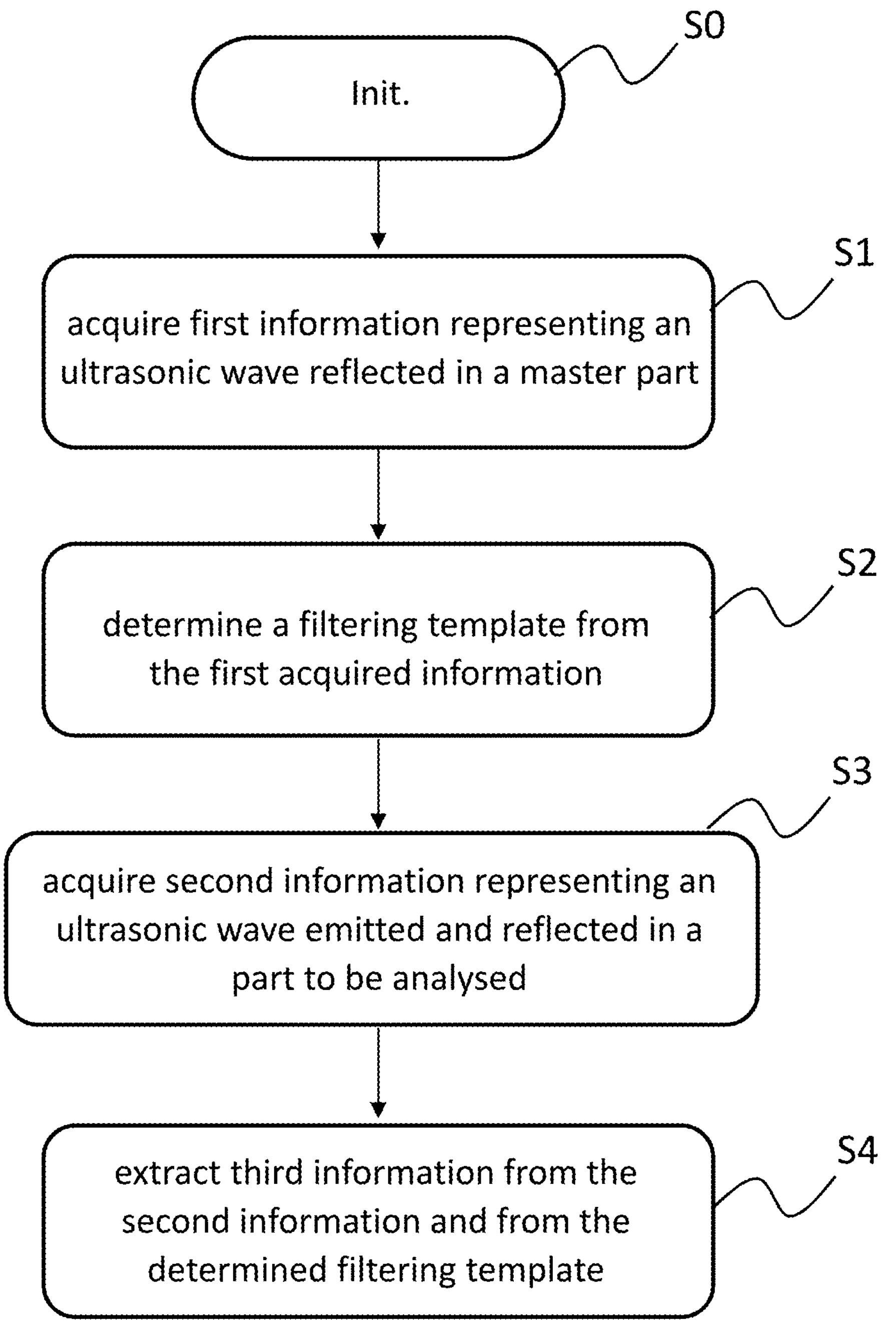
FIG. 6 illustrates a method for analyzing the quality of a mechanical part according to one embodiment.

FIG. 6 schematically illustrates a method for analyzing the quality of a mechanical part. A step S0 is an initialization step, on completion of which the analysis system 1 is operational and available for carrying out an analysis. The processing unit 100 is initialized and executes analysis software configured to control the transducer 12. The processing unit 100 is able to generate an ultrasonic wave 16 from the transducer 12 and to pick-up an ultrasonic wave reflected from the same transducer 12. During a step S1, a master mechanical part, which is considered to be a master part, devoid of any integrity defects, is used for the purpose of analyzing all the reflected ultrasonic wave reflections resulting from the shape of the mechanical part. The reference ultrasonic wave 16 is successively emitted by the transducer 12 at any point of the application path 18, and first information, representing the reflection of this wave, is picked-up by the transducer 12, then stored in a working memory of the processing unit 100, for each of the points of the application path 18. For example, in the case of a parallelepiped mechanical part devoid of any defects, the echo of the reference ultrasonic wave 16 is the echo of the wave on the bottom of the part. During a step S2, the processing unit 100 automatically determines a filtering template taking into account the first acquired information for each of the points of the application path. For example, for each point of the application path, an analysis time window is limited to the time interval preceding the return of the background echo, so as to dispense with this type of information, which is normally expected and in no way corresponds to an integrity defect of a part. During a step S3, the master mechanical part is replaced by the mechanical part 10 to be analyzed, which has at least one defect **10*d*. The reference ultrasonic wave 16 is then applied to each of the points on the mechanical part 10 along a second application path that is preferably identical to the first application path 18 used for the master part. However, it is possible to use a second application path for the ultrasonic wave if the position of the transducer 12 can be known and defined automatically, for example, if the position of the transducer 12 is controlled by automated or robotized means. During this application of the ultrasonic wave, second information representing the reflection of the reference ultrasonic wave 16 in the mechanical part 10 is acquired via the transducer 12, including the echo of the defect 10*d* in the mechanical part 10. Finally, during a step S4, the filtering template determined in step S2 with the master mechanical part is used to separate the information representing the wave reflected by normal shapes of the mechanical part 10 and the information representing integrity defects in the mechanical part 10. Thus, the information representing integrity defects in the mechanical part 10 is extracted from the sum of the second information that is picked-up and only the information representing potential integrity problems in the mechanical part will be displayed and revealed to the user, for analysis purposes. This is particularly advantageous when a mechanical part has complex shapes, and notably multiple thicknesses depending on the zones of the part, or ribs, reinforcements, etc. Of course, the described extraction function can be inhibited by a user of the processing unit 100**, for example, via a dedicated command of analysis software, in order to be able to carry out an exhaustive analysis of the reflected ultrasonic wave.

Figure 7:
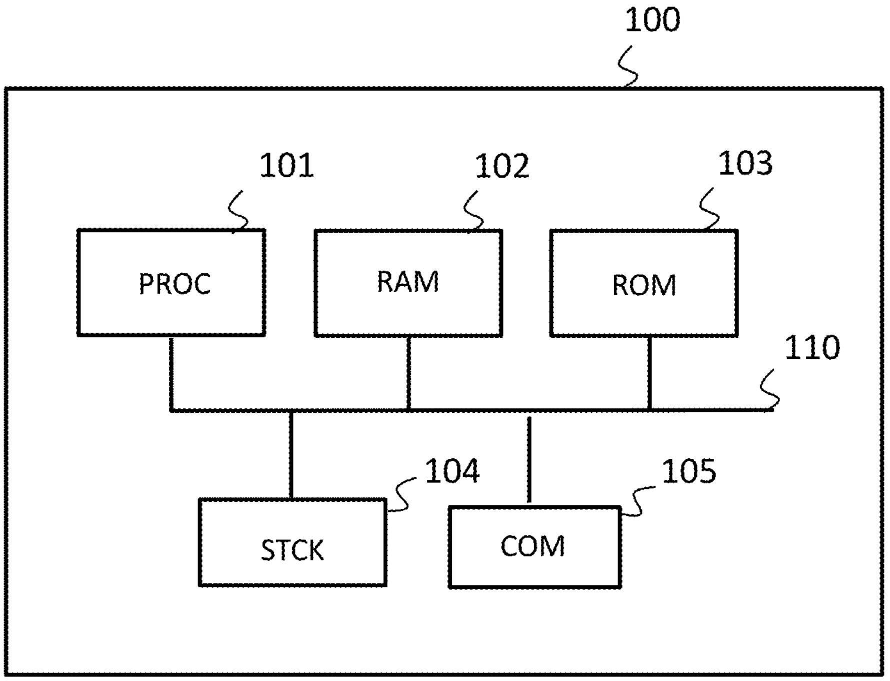
FIG. 7 schematically shows an internal architecture of the analysis system already shown in FIG. 1.

FIG. 7 schematically shows an architecture of the processing unit 100 configured to execute a method for analyzing the quality of a mechanical part such as, for example, the method described above, notably with reference to FIG. 6.

By way of an illustration, FIG. 7 illustrates an internal layout of the processing unit 100. It should be noted that FIG. 7 could also schematically illustrate an example of the hardware architecture of a control unit inside the processing unit 100.

According to the example of a hardware architecture shown in FIG. 7, the processing unit 100 then comprises, connected by a communication bus 110: a processor or CPU (Central Processing Unit) 101; a RAM (Random Access Memory) 102; a ROM (Read Only Memory) 103; a storage unit such as a hard disk (or a storage medium reader, such as an SD (Secure Digital) card reader) 104; at least one communication interface 105 also providing input/output port type interfaces, notably designed to receive and transmit simple or compound signals and allowing the processing unit 100 to communicate with the devices and circuits inside the transducer 12, notably including the ultrasonic wave transmitter **12*e* and the ultrasonic wave sensor 12*r*, via the link 14, as well as various optional additional ultrasonic wave transmitters and sensors. The communication interface 105** also allows connection to a display device provided with a user interface (for example, a keyboard, a mouse, a stylus, a trackpad, etc.).

The processor 101 is capable of executing instructions loaded into the RAM 102 from the ROM 103, an external memory (not shown), a storage medium (such as an SD card), or attached to a communication network. When the processing unit 100 is powered up, the processor 101 is able to read instructions from the RAM 102 and to execute them. These instructions form a computer program causing the processor 101 to implement part of a method described with reference to FIG. 6 or a derivative thereof.

All or part of the method implemented by the processing unit 100, or its alternative embodiments, can be implemented in software form by executing a set of instructions using a programmable machine, for example, a DSP (Digital Signal Processor) or a microcontroller, or can be implemented in hardware form by a dedicated machine or component, for example, an FPGA (Field-Programmable Gate Array) or an ASIC (Application-Specific Integrated Circuit). In general, the processing unit 100 comprises electronic circuitry configured to implement the described method with reference to itself and to external devices for emitting and picking-up ultrasonic waves. Of course, the processing unit 100 further comprises all the elements usually present in a system comprising a control unit and its peripherals, such as a power supply circuit, a power supply monitoring circuit, one or more clock circuits, a reset circuit, input/output ports, interrupt inputs, bus drivers, digital-to-analogue and analogue-to-digital converters, ideally fast converters, with this list being non-exhaustive.

The systems and devices described herein may include a controller, such as a control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for analyzing a quality of a first mechanical part using non-destructive testing, comprising:

acquiring first information representing an ultrasonic wave reflected when emitting said ultrasonic wave along a first application path in a second mechanical part made of a material identical to that from which the first mechanical part is made and having the same shape as the first mechanical part;

defining a measurement data filtering template from said first information so as to define an information exclusion zone below which said first information is automatically drawn from a graphical representation;

emitting said ultrasonic wave into the first mechanical part by applying it via a second application path;

acquiring, via at least one sensor, second information representing said ultrasonic wave reflected in the first mechanical part when emitting the ultrasonic wave; and extracting third information representing said quality of said first part from said second acquired information and from said filtering template.

2. The method for analyzing according to claim 1, wherein said filtering template is automatically determined from said first information.

3. The method for analyzing according to claim 1, wherein said acquiring first information is based on a simulation of an emission and reflection of the ultrasonic wave in a mechanical part of predefined shape.

4. The method for analyzing according to claim 1, wherein said first information is acquired from at least one ultrasonic wave sensor.

5. The method for analyzing according to claim 1, wherein said template is determined from a plurality of time intervals respectively associated with one or more filtering amplitude levels of the reflected ultrasonic wave.

6. The method for analyzing according to claim 5, wherein at least one time interval is associated with a plurality of filtering amplitude levels of the reflected ultrasonic wave, with said amplitude levels exhibiting mutual continuity.

7. The method for analyzing according to claim 1, wherein said second path is identical to said first path followed when emitting said wave in the second mechanical part.

8. The method for analyzing according to claim 1, further comprising representing said third information only on said graphical representation.

9. The method for analyzing according to claim 1, wherein said filtering template is adjusted after all or some of the second information representing said ultrasonic wave reflected in the first mechanical part has been acquired.

10. A system for analyzing a quality of a first mechanical part using non-destructive testing, comprising:

an input interface configured to acquire first information representing an ultrasonic wave reflected when emitting said ultrasonic wave along a first application path in a second mechanical part made of a material identical to that from which the first mechanical part is made and having the same shape as the first mechanical part;

a first control unit configured to define a measurement data filtering template from said first information, so as to define an information exclusion zone below which said first information is automatically drawn from a graphical representation;

a transducer configured to emit said ultrasonic wave into the first mechanical part by applying it via a second application path;

at least one sensor configured to acquire second information representing said ultrasonic wave reflected in the first mechanical part when emitting the ultrasonic wave; and a second control unit configured to extract third information representing said quality of said first part from said second acquired information and from said filtering template.

11. The system for analyzing according to claim 10, wherein said input interface is an ultrasonic wave sensor.

12. A non-transitory computer readable medium storing a computer program product comprising program code instructions for:

acquiring first information representing an ultrasonic wave reflected when emitting said ultrasonic wave along a first application path in a second mechanical part made of a material identical to that from which the first mechanical part is made and having the same shape as the first mechanical part;

defining a measurement data filtering template from said first information so as to define an information exclusion zone below which said first information is automatically drawn from a graphical representation;

emitting said ultrasonic wave into the first mechanical part by applying it via a second application path;

acquiring, via at least one sensor, second information representing said ultrasonic wave reflected in the first mechanical part when emitting the ultrasonic wave; and extracting third information representing said quality of said first part from said second acquired information and from said filtering template.

* * * * *